United States Patent
Skelton et al.

(10) Patent No.: US 12,147,928 B1
(45) Date of Patent: Nov. 19, 2024

(54) SYSTEMS AND METHODS FOR PERFORMING VEHICLE INSPECTIONS

(71) Applicants: Clay Skelton, Roanoke, VA (US); Brady Sheffer, Roanoke, VA (US)

(72) Inventors: Clay Skelton, Roanoke, VA (US); Brady Sheffer, Roanoke, VA (US)

(73) Assignee: Mill Mountain Capital, LLC, Roanoke, VA (US)

( * ) Notice: Subject to any disclaimer, the term of this patent is extended or adjusted under 35 U.S.C. 154(b) by 144 days.

(21) Appl. No.: 17/951,371

(22) Filed: Sep. 23, 2022

Related U.S. Application Data

(60) Provisional application No. 63/247,716, filed on Sep. 23, 2021.

(51) Int. Cl.
*G06Q 10/06* (2023.01)
*G06Q 10/0639* (2023.01)
*H04W 4/029* (2018.01)

(52) U.S. Cl.
CPC ...... *G06Q 10/06398* (2013.01); *H04W 4/029* (2018.02)

(58) Field of Classification Search
None
See application file for complete search history.

(56) References Cited

U.S. PATENT DOCUMENTS 10,102,589 B1 * 10/2018 Tofte .............. G06V 10/42

\* cited by examiner

*Primary Examiner* — K. Wong
(74) *Attorney, Agent, or Firm* — Rhodes IP PLC; Christopher R Rhodes

(57) ABSTRACT

Vehicle inspection systems that can be used to monitor compliance with vehicle inspections are described. The vehicle inspection system can include a communication device, and a processor. The processor can be used to monitor an inspector travel path around the vehicle during inspection of the vehicle by the inspector and to receive inspector inputs during inspection of vehicle components. A circumnavigated path produced from the monitored inspector travel path and the received inspector inputs can be transmitted to a remote administrator through the communication device.

20 Claims, 13 Drawing Sheets

SYSTEMS AND METHODS FOR PERFORMING VEHICLE INSPECTIONS

PRIORITY APPLICATION

This application claims priority to and the benefit of U.S. Provisional Application No. 63/247,716 filed on Sep. 23, 2021, the entire disclosure of which is hereby incorporated herein by reference for all purposes.

TECHNOLOGICAL FIELD

Certain embodiments described herein are directed to systems and methods for performing vehicle inspections. In certain configurations, the vehicle inspection system can be configured to monitor an inspector travel path around the vehicle during inspection of the vehicle by the user.

BACKGROUND

Commercial vehicles are often required to be periodically inspected by operators. For example, various components of commercial vehicles may be periodically checked for proper function.

SUMMARY

Certain aspects are directed to vehicle inspection systems that can be used to monitor and transmit a vehicle inspection report to a remote administrator.

In an aspect vehicle inspection system for monitoring inspection of a vehicle by an inspector is described. In certain configurations, the vehicle system comprises a communication device and a processor electrically coupled to the communication device. The processor can be configured to monitor an inspector travel path around the vehicle during inspection of the vehicle by the user, to receive inspector inputs during inspection of vehicle components and to transmit a circumnavigated path produced from the monitored inspector travel path and the received inspector inputs to a remote administrator through the communication device.

In certain embodiments, the vehicle inspection system is configured to monitor the inspector travel path during the inspection without the use of any RFID tags or any external electronic devices attached to the vehicle or any vehicle component to be inspected. In other embodiments the communication device comprises a cellular antenna. In some examples, the communication device comprises a GPS device. In other examples, the system comprises application software on a computer readable medium electrically coupled to the processor. In certain examples, the processor is configured to track an inspection time after initiation of the inspection by the inspector and before transmission of the inspector inputs to the remote administrator.

In some embodiments, the application software comprises a user interface configured to receive the inspector inputs. In some configurations, the user interface comprises inspector inputs to inspect one or more of service brakes including any trailer brake connections, parking (hand) brake, steering mechanism, lighting devices, reflectors, tires, horn, windshield wipers, rear-vision mirrors, any coupling devices, wheels, rims or emergency equipment. In certain embodiments, the user interface comprises inspector inputs to inspect each of service brakes including any trailer brake connections, parking (hand) brake, steering mechanism, lighting devices, reflectors, tires, horn, windshield wipers, rear-vision mirrors, any coupling devices, wheels, rims and emergency equipment.

In some embodiments, the vehicle inspection system comprises a telematics device coupled to the processor through the communication device.

In another aspect, a system comprises a mobile device and non-transitory computer readable medium having instructions stored thereon, wherein the instructions, when executed by a processor of the mobile device, cause the processor to monitor an inspector travel path around a vehicle during inspection of the vehicle by an inspector holding the mobile device and to transmit a circumnavigated path produced from the monitored inspector travel path to a remote administrator through a communication device of the mobile device.

In certain embodiments, the system is configured to monitor the inspector travel path during the inspection without the use of any RFID tags or any external electronic devices attached to the vehicle or any vehicle component to be inspected. In some examples, the communication device comprises a cellular antenna, a GPS device or both.

In certain examples, the system comprises application software on the non-transitory computer readable medium. In some examples, the processor is configured to track an inspection time after initiation of the inspection by the inspector and before transmission of the inspector inputs to the remote administrator.

In certain embodiments, the application software comprises a user interface configured to receive the inspector inputs. In some configurations, the user interface comprises inspector inputs to inspect one or more of service brakes including any trailer brake connections, parking (hand) brake, steering mechanism, lighting devices, reflectors, tires, horn, windshield wipers, rear-vision mirrors, any coupling devices, wheels, rims or emergency equipment. In other configurations, the user interface comprises inspector inputs to inspect each of service brakes including any trailer brake connections, parking (hand) brake, steering mechanism, lighting devices, reflectors, tires, horn, windshield wipers, rear-vision mirrors, any coupling devices, wheels, rims and emergency equipment.

In some embodiments, the system comprises a telematics device coupled to the processor through the communication device.

In an additional aspect, a non-transitory computer readable medium having instructions stored thereon is provided. In certain embodiments, the instructions, when executed by a processor, cause the processor to monitor an inspector travel path around a vehicle during inspection of the vehicle by an inspector holding a mobile device and to transmit a circumnavigated path produced from the monitored inspector travel path to a remote administrator through a communication device of the mobile device.

In certain configurations, the instructions are configured to monitor the inspector travel path during the inspection without the use of any RFID tags or any external electronic devices attached to the vehicle or any vehicle component to be inspected. In some embodiments, the communication device comprises a cellular antenna, a GPS device or both.

In other embodiments, the instructions cause the processor to display a user interface on the mobile device, wherein the displayed user interface is configured to receive the inspector inputs. In some examples, the displayed user interface comprises inspector inputs to inspect one or more of service brakes including any trailer brake connections, parking (hand) brake, steering mechanism, lighting devices, reflectors, tires, horn, windshield wipers, rear-vision mirrors, any coupling devices, wheels, rims or emergency equipment.

In another aspect, a remote administrator system configured to wirelessly couple to a remote vehicle inspection system is described. The remote administrator system can receive an inspection report from the remote vehicle inspection system. The remote vehicle inspection system can be configured to monitor an inspector travel path around the vehicle during inspection of the vehicle by the user, to receive inspector input during inspection of vehicle components and to transmit a circumnavigated path produced from the monitored inspector travel path and the received inspector inputs to the remote administrator system through the communication device. The remote administrator system comprises a processor, and a non-transitory computer readable medium having instructions stored thereon, wherein the instructions, when executed by the processor of the remote administrator system, cause a communication device of the remote administrator system to receive the circumnavigated path from a mobile device of the vehicle inspection system.

In an additional aspect, a method of monitoring inspection of a vehicle comprises initiating application software on a mobile device comprising a non-transitory computer readable medium having instructions stored thereon, wherein the instructions, when executed by a processor, cause the processor to permit entry of vehicle inspection parameters into the mobile device. The method can also include using the mobile device to monitor an inspector travel path around a vehicle as the vehicle is inspected. The method can also include transmitting the entered vehicle inspection parameters and the monitored inspector travel path to a remote administrator system.

In certain embodiments, the processor is configured to activate an accelerometer of the mobile device when the application software is initiated, e.g., the accelerometer can be used to track an inspection position as the inspector travels around the vehicle during the inspection. In some embodiments, the processor is configured to activate a global positioning sensor of the mobile device when the application software is initiated.

Additional aspects, features, embodiments, examples and configurations are also described in more detail below.

BRIEF DESCRIPTION OF THE SEVERAL VIEWS OF THE DRAWINGS

Certain configurations of a vehicle inspection system are described with reference to the accompanying figures in which.

DETAILED DESCRIPTION

Certain embodiments described herein are directed to systems and methods that can be used to perform vehicle inspections. For example, certain systema and methods use application software for performing a vehicle inspection to assist in ensuring components of the vehicle are inspected. In some configurations, application software on a mobile device, e.g., phone, tablet, laptop, etc., can be used to perform a vehicle inspection without the use of any tags, external sensors or electronic devices added to various areas of the vehicle or internal devices within the vehicle itself.

In one example, an inspector can exit a vehicle with a mobile device and move around the vehicle to inspect various components of the vehicle. A remote or local system can monitor movement and/or the travel path of the inspector around the vehicle to verify that the inspector has actually traversed an inspection path around the vehicle. The inspection path can be tracked and/or recorded as verification of the vehicle inspection.

In some examples, the inspection methodology can be integrated into a larger platform that may also monitor vehicle operation/status. For example, the larger platform may comprise telematics that can be used to monitor the location, speed, etc. of the vehicle. In some examples, the telematics and/or the inspection system may not use any external control devices, whereas in other instances, one or more external control devices can be present in the vehicle and used with telematics functionality.

Figure 1:
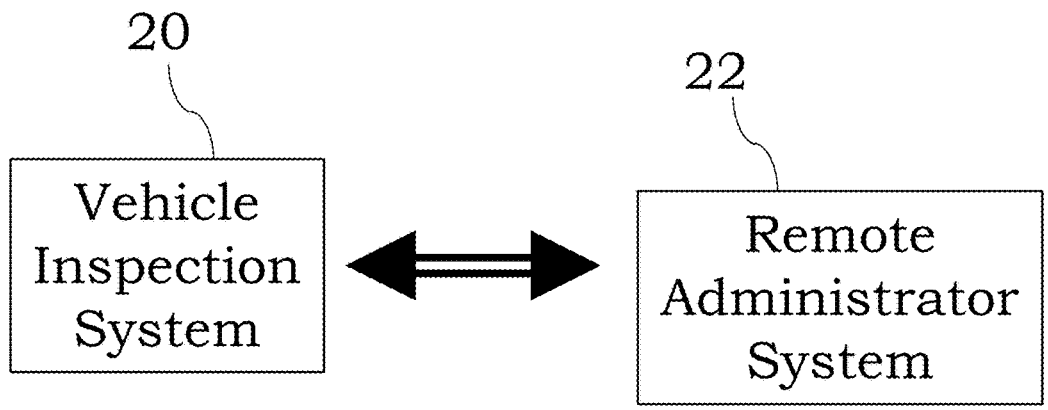
FIG. 1 is a block diagram showing a vehicle inspection system and a remote administrator system, in accordance with certain embodiments.

In certain embodiments, the inspection system typically comprises a vehicle inspection device/system 20 and a remote administration system 22 as shown in FIG. 1. The vehicle inspection device/system 20 is typically present on a mobile device that an inspector may move with them as them inspect the vehicle. The remote administrator system 22 is located remotely from the vehicle inspection system 20 and can be designed to receive information from the vehicle inspection system 20 over a communication network. For example, the vehicle inspection system 20 can transmit inspection information entered by an inspector of a vehicle over a communication network to the remote administrator system 22. An administrator can review the received inspection information or it may be reviewed in an automated manner to ensure that suitable parameters and components of the vehicle have been inspected on a selected basis. In some embodiments, the vehicle inspection system 20 can operate as a stand-alone device and without any external control device(s) coupled to the vehicle being inspected. Whereas in other configurations, the vehicle inspection system 20 can communicate with a control device in the vehicle being inspected.

Figure 2:
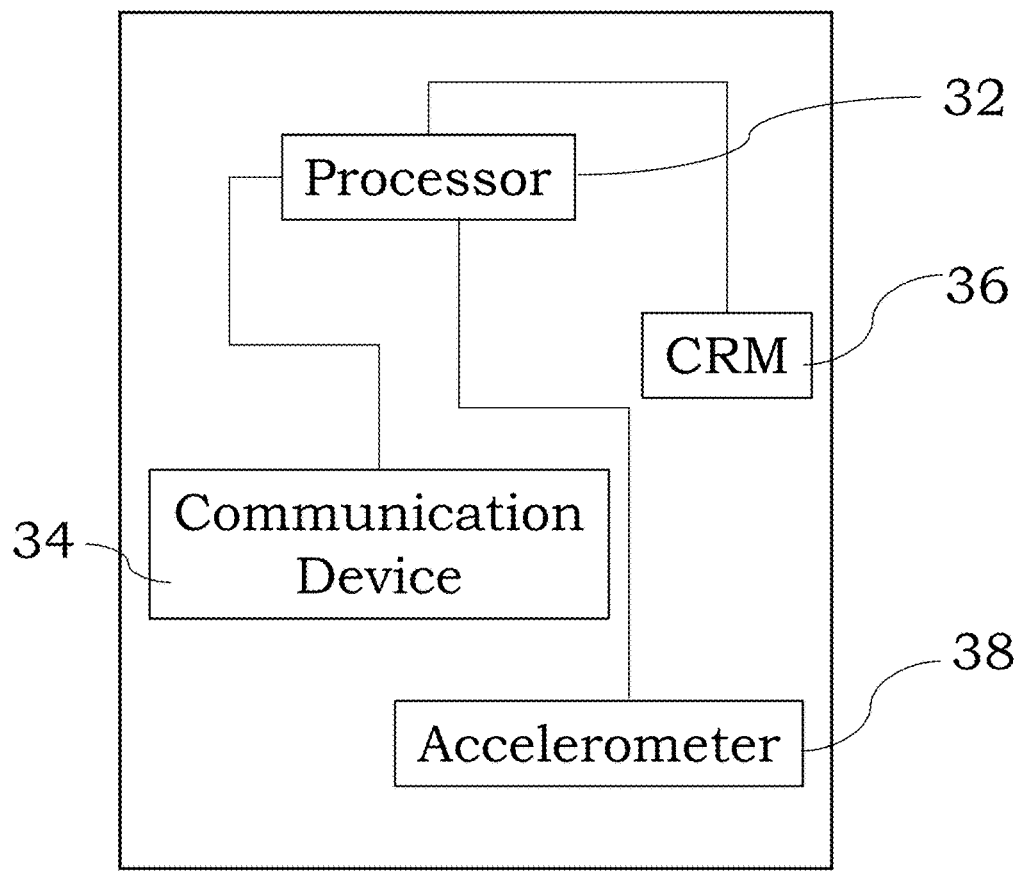
FIG. 2 is a block diagram showing certain components of a vehicle inspection system or a remote administration system, in accordance with certain embodiments.

In certain embodiments, each of the vehicle inspection system 20 and the remote administrator system 22 generally comprises a processor 32 electrically coupled to a communication device 34 and an optional accelerometer 38 as shown in FIG. 2. As noted in more detail below, the communication device can be, or can include, one or more of an antenna, a GPS device or other electronic devices that can communicate with the processor 32 or an electrical device or system separate from the inspection system 20 or the administrator system 22. The systems also typically include a computer readable medium (CRM) 36 which can include instructions used to operate the various systems, as noted in more detail below. The vehicle inspection system 20 typically takes the form of a mobile device, laptop, tablet, smart watch or other easily portable electronic devices. The vehicle inspection system 20 includes a user interface to permit entry of inspection parameters into the vehicle inspection system 20. The information which is entered into the vehicle inspection system 20 can be transmitted from the communication device of the vehicle inspection system 20 to the communication device of the remote administrator system 22. The remote administrator system 22 typically comprises a dashboard of information related to the vehicle being inspected and can also include telematics functionality if desired. The accelerometer 38, when present, can be used to monitor the position and/or number of steps that an inspector of a vehicle takes traversing a travel path around a vehicle during the inspection.

Figure 3:
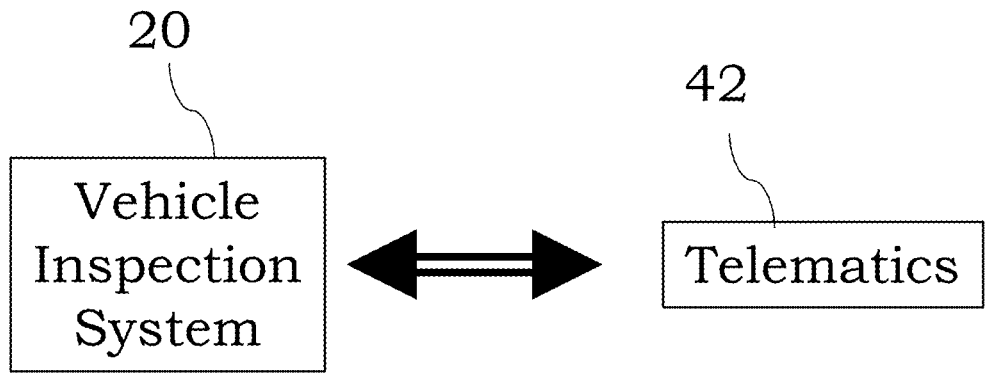
FIG. 3 is a block diagram showing a vehicle inspection system and a telematics system, in accordance with certain embodiments.

In certain embodiments, the vehicle inspection system 20 can be coupled (in a wired or a wireless manner) to a telematics device as shown in FIG. 3. The telematics device/system 42 may be present in the vehicle itself or may be located on the remote administrator system 22. For example, the telematics device/system 42 may be a device which can plug into an OBDII port of the vehicle, a CAN bus of the vehicle, a 6-pin port, a 9-pin port or other vehicle ports to receive information about the vehicle, e.g., speed, GPS location, etc. The vehicle inspection system 20 can interface with the telematics system 42 and may send information through the telematics system 42 to a remote administrator system 22. This information can be sent over a cellular network, a satellite network or other networks. The vehicle inspection system 20 can couple to the telematics system 42 through a wired or wireless connection including a Bluetooth connection if desired.

Figure 4:
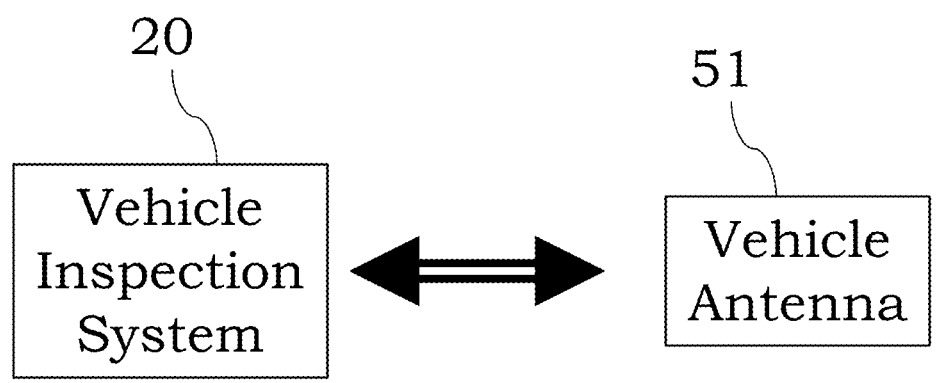
FIG. 4 is a block diagram showing a vehicle inspection system and a vehicle antenna, in accordance with certain embodiments.

In some embodiments, the vehicle inspection system 20 can couple to an antenna of the vehicle to transmit information through the antenna of the vehicle. As shown in FIG. 4, a vehicle can include an existing antenna 51 that may be accessible by the vehicle inspection system 20. Information entered into the vehicle inspection system 20 can be transmitted to the remote administrator system 22 through the vehicle antenna 51. In some embodiments, the vehicle inspection system 20 can pair or couple to a software application running in the vehicle, e.g., on a vehicle user interface system, to permit the vehicle inspection system 20 to access the antenna 51. Information entered into the vehicle inspection system can be sent to the vehicle user interface system and transmitted through the vehicle antenna 51 to a remote administrator system.

Figure 5:
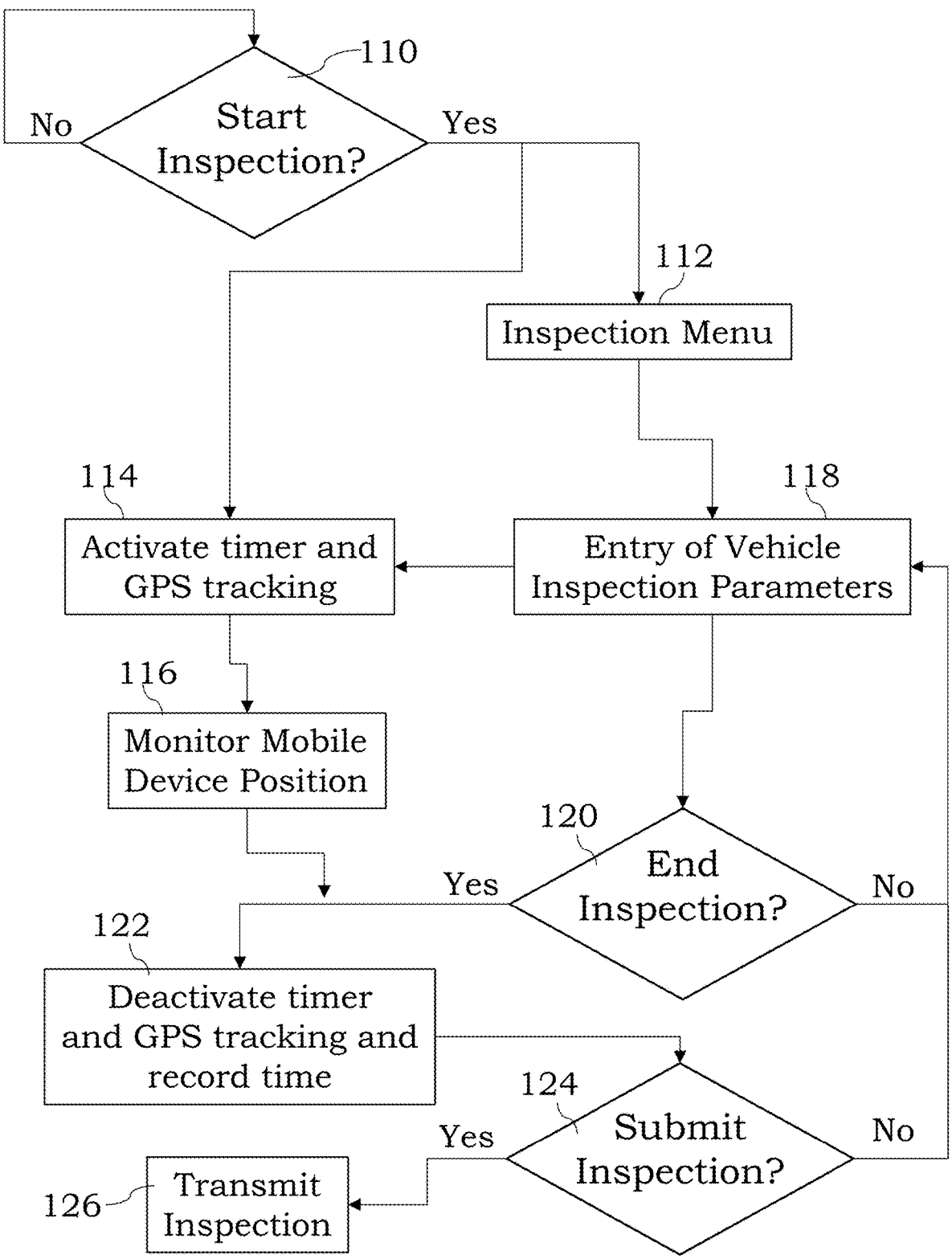
FIG. 5 is a flow chart showing operation of a vehicle inspection system to inspect a vehicle, in accordance with certain embodiments.

In some embodiments, a user interface may be present on the vehicle inspection system, e.g., a mobile device, to permit selection of an inspection record tab. The user interface may be a standalone user interface or can be integrated into another user interface, e.g., a third-party telematics provider interface including, for example, telematics interfaces and software commercially available from AT&T Fleet Complete, Azuga, Clearpath GPS, Geotab, GPS Insight, GPS Trackit, Lytx, Motive, Omnitracs, Platform Science, Samsara, Transflo, Verizon Connect, Webfleet by TomTom Telematics, Zubie and other third-party telematics providers. Notwithstanding that the user interface may be present on many different types of platforms and devices, a generalized schematic of the inspection process is shown in FIG. 5. Application software can include suitable menus and may be opened to permit entry of vehicle inspection parameters, as discussed in more detail below. An inspector can initiate the inspection process at step 110 by selecting a suitable key or button on the application software. This selection starts the vehicle inspection menu at a step 112 and activates a timer and GPS tracking functionality of the mobile device at a step 114. Once the GPS tracking is active, the GPS monitors the position of the mobile device as inspector moves around the vehicle for inspection at step 116. The GPS position can be monitored continuously or may track different positions at intervals of 1 foot, 2 feet, 3 feet, 4, feet, 5 feet, 6 feet, 7 feet, 8 feet, 9 feet, 10 feet, 11 feet, 12 feet, 13 feet, 14 feet, 15 feet, 16 feet or more. Where the GPS monitoring provides a plurality of discretely monitored positions, the discrete position can be connected to provide an overall path traversed by the inspector. The inspector can enter inspection parameters into the user interface at a step 118. For example, the vehicle inspector can go through a check list of components on the application software, take pictures and/or make notes. If the inspection menu is active, then the system tracks the inspection time and the GPS location of the inspector's mobile device. The inspector can end the inspection at a step 120. This ending deactivates the timer and GPS tracking and records the total inspection time at step 122. The inspector can then submit the inspection at a step 124 to transmit the inspection at step 126 to the remote administrator system. Alternatively, the inspector can re-enter into the inspection parameters, which reactivates the timer and GPS tracking until the inspector ends the inspection at the step 120. The total inspection time can then be summed and transmitted along with the inspection parameters. During the inspection, a circumnavigation path can be created by monitoring the GPS location of the inspector's mobile device to show the path of the inspector around the vehicle. Once the vehicle inspection is complete, the inspector can finish or end the inspection, and the contents of the inspection, any pictures and the inspector's path around the vehicle can be transmitted to a remote administrator. If desired, if the total inspection time is below a threshold time, then the inspection submission can be rejected as not being compliant, which forces the inspector to reinspect the vehicle. Alternatively, where an accelerometer is activated, the number of steps by the inspector can be measured and used to determine if the measured steps fall within a threshold step window. For example, a minimum number of steps can be required for the inspection to be considered compliant. Reinspection can reactivate the GPS tracking and timer with the additional time and path being added into the inspection report that is transmitted. This rejection step is optional and can be eliminated if desired. For example, the remote administrator can review the inspection record and determine if the inspection record is complete notwithstanding the total inspection time may be lower than is typical or desired. If desired, the remote administrator may be able to deactivate the vehicle from being started until a proper vehicle inspection is submitted to prevent the operator from operating an uninspected and/or unsafe vehicle.

In certain embodiments, the vehicle inspection may occur where there is no cellular network, satellite network or connection to the remote administrator system. In such instances, the vehicle inspection can be saved locally on the mobile device and then transmitted to the remote administrator system once the mobile device reconnects to the network. The remote administrator system can be configured to periodically poll the inspection system for the latest inspection information. If desired, the remote administrator system can force inspection of the vehicle after a certain period, e.g., 4 hours, 8 hours, 1 day, 1 week, 1 month, etc.

In certain configurations, the vehicle inspection system can include a user interface with specific boxes or parameters to be checked for different items to be inspected. Items to be repaired can be noted so a remote administrator is aware of the defects discovered during inspection. Such defects may trigger an alert or flag in a remote administrator system that alerts the administrator that repairs are needed. As noted herein, this entire process can occur without using any tags, keys, RFID devices or other electronic devices placed on or near the vehicle items to be inspected.

In certain embodiments, the exact inspection parameters placed in the user interface to be inspected may vary depending on the type of vehicle and/or the site of vehicle operation. The vehicle inspection system can be used for pre-trip inspections, intra-trip inspections and/or post-trip inspections. For example, a vehicle inspection can include inspection of one or more of the following items to be inspected: service brakes including any trailer brake connections, parking (hand) brake, steering mechanism, lighting devices and reflectors, tires, horn, windshield wipers, rear-vision mirrors, any coupling devices, wheels and rims and any emergency equipment. In other configurations, the vehicle inspection system can include one or more of the following items to be inspected: brakes, lighting devices, lamps, markers, and conspicuity marking material, wheels, rims, lugs, tires, air line connections, hoses, and couplers, king pin upper coupling device, rails or support frames, tie down bolsters, locking pins, clevises, clamps, or hooks, sliders or sliding frame lock. The vehicle inspection system can be tailored to the vehicle or vehicle class. For example, different commercial vehicles, e.g., buses, trucks, etc., may have different inspection requirements. A specific box or menu on the vehicle inspection system may exist for each of the items to be inspected, and that must be checked after inspection before the inspector can submit the inspector report. If desired, the vehicle inspection system can time stamp when each box is checked or selected so the vehicle inspector travel path can be correlated with inspection of a particular item to ensure a proper inspection of that item was performed. This latter feature would reduce the likelihood that the vehicle inspector walks around the vehicle without actually properly inspecting each component. In certain embodiments, the systems and methods described herein can be used to monitor circumnavigation of a vehicle as an inspector is performing an inspection. The circumnavigation path can be used to verify an inspection was actually performed versus an inspector merely checking the inspection boxes without exiting the vehicle. Circumnavigation monitoring can promote inspection compliance by an inspector or driver operating a vehicle.

The exact vehicle used with the systems and methods described herein may vary. For example, automobiles, trucks, trains, buses, subways, airplanes or other devices that include a combustion engine, electric engine, fuel cell or other engine or device that can provide power to one or more wheels or other mechanisms of propulsion, e.g., a jet turbine, can be used with the technology described herein to inspect these vehicles. The exact configuration of the technology described herein can vary depending on the end-use application, and the configuration may desirably be different where the technology is used in a passenger vehicle as compared to using it in a commercial vehicle or public transit vehicle. Unless otherwise clear from the context of the usage, the term "public transit vehicle" is intended to encompass all vehicles designed to transport people including subways, buses, airplanes, taxis, or other above or below ground electric or combustion engine powered devices commonly encountered or used to travel from one place to another.

The systems described herein typically include at least one processor and optionally a memory unit, storage or other electrical components. The processor can be used, in combination with one or more antennae to provide information about the path taken by the inspector and to send and receive information to and from other components or systems. Such processes may be performed automatically by the processor without the need for user intervention or an inspector may enter parameters through a user interface. In certain configurations, the processor may be present in one or more computer systems and/or common hardware circuitry including, for example, a microprocessor and/or suitable software for operating the system. The processor can be integral to the systems or may be present on one or more accessory boards, printed circuit boards or computers electrically coupled to the components of the system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Intel Core™ processors, Intel Xeon™ processsors, AMD Ryzen™ processors, AMD Athlon™ processors, AMD FX™ processors, Motorola PowerPC, Sun UltraSPARC, Hewlett-Packard PA-RISC processors, Apple-designed processors including Apple A12 processor, Apple A11 processor and others or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, vehicle information, etc. during operation of the system. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system. For example, computer control can be implemented to remotely monitor the travel path during an inspection, to track vehicle position and information, to update application software, etc. The processor typically is electrically coupled to a power source which can, for example, be a direct current source, an alternating current source, a battery, a fuel cell or other power sources or combinations of power sources. In a typical configuration, the processor is configured to use the 12V DC power system of a vehicle. The power source can be shared by the other components of the system. The system may also include one or more input devices, for example, a keyboard, mouse, trackball, microphone, touch screen, manual switch (e.g., override switch) and one or more output devices, for example, a printing device, display screen, lights, speaker. As noted herein, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface, a USB interface, a Fibre Channel interface, a Firewire interface, a M.2 connector interface, a PCIE interface, a mSATA interface or the like or through one or more wireless interfaces, e.g., Bluetooth, Wi-Fi, Near Field Communication or other wireless protocols and/or interfaces.

In certain embodiments, the mobile device used to perform the inspection may comprise a storage system. The storage system typically includes a computer readable and writeable nonvolatile recording medium in which codes of software can be stored that can be used by a program to be executed by the processor or information stored on or in the medium to be processed by the program. The medium may, for example, be a hard disk, solid state drive or flash memory. The program or instructions to be executed by the processor may be located locally or remotely and can be retrieved by the processor by way of an interconnection mechanism, a communication network or other means as desired. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC), microprocessor units MPU) or a field programmable gate array (FPGA) or combinations thereof. Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known microprocessors available from Intel, AMD, Apple and others. Many other processors are also commercially available. Such a processor usually executes an operating system which may be, for example, the Windows 7, Windows 8 or Windows 10 operating systems available from the Microsoft Corporation, MAC OS X, e.g., Snow Leopard, Lion, Mountain Lion, Mojave, High Sierra, El Capitan or other versions available from Apple, the Solaris operating system available from Sun Microsystems, or UNIX or Linux operating systems available from various sources. Many other operating systems may be used, and in certain embodiments a simple set of commands or instructions may function as the operating system. Further, the processor can be designed as a quantum processor designed to perform one or more functions using one or more qubits. In some instances, a simple set of commands may be present on the mobile device and can be updated from time to time using one or more wired connectors on the vehicle system or wirelessly using the communications interface.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C#(C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the system may comprise a software interface on the mobile device and a separate software interface on a remote administration system. Instructions can be entered on the remote administration system and transmitted to the mobile device over a cellular network. The instructions stored in the memory can execute a software module or control routine for the system, which in effect can provide a controllable model of the system.

In certain embodiments, the exact mobile device use with the vehicle system may vary and the mobile device typically comprises a subscriber identification module (SIM) chip or card that can be used to provide 2-way communication between the mobile device and another system, e.g., a telematics system, a remote system, etc. Illustrative mobile devices include, but are not limited to, cellular phones, tablets, laptops, wearable devices such as Fitbit® devices, iWatch® devices and other electronic devices that can send or receive messages or signals over a cellular network.

In certain embodiments, the mobile device can include a communication device and/or an antenna to permit wireless communication between various components. For example, the antenna may be one or more of a Bluetooth antenna, a cellular antenna, a radio antenna, other antennas or combinations thereof. In a typical configuration, a suitable antenna is present on another system electrically coupled to the vehicle so it can pair or talk to the mobile device. For example, a vehicle interface may comprise a Bluetooth antenna that can pair with a Bluetooth antenna on the mobile device by way of Bluetooth radio pairing. This pairing permits the interface (and other components of the vehicle) and the mobile device to exchange information and also permits the vehicle to send suitable signals to control functions of the mobile device.

Figure 6:
FIG. 6 is an illustration showing a vehicle inspection system menu, in accordance with certain embodiments.
Figure 7:
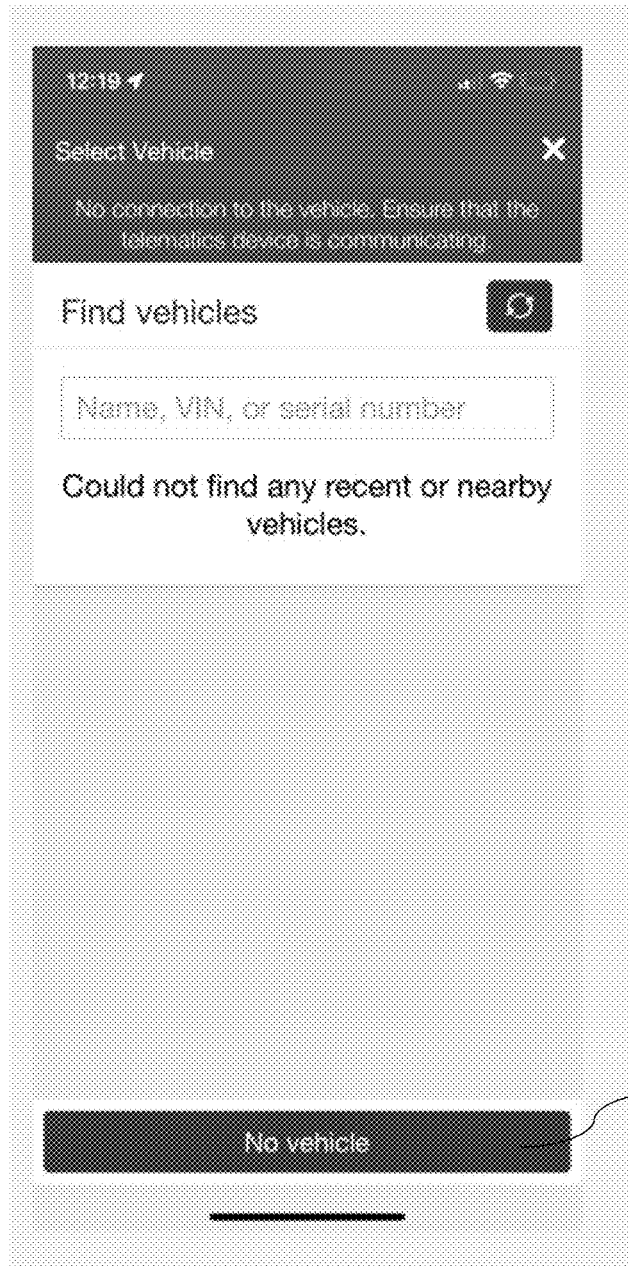
FIG. 7 is an illustration showing a vehicle inspection system menu to add a vehicle or asset to be inspected, in accordance with certain embodiments.
Figure 8:
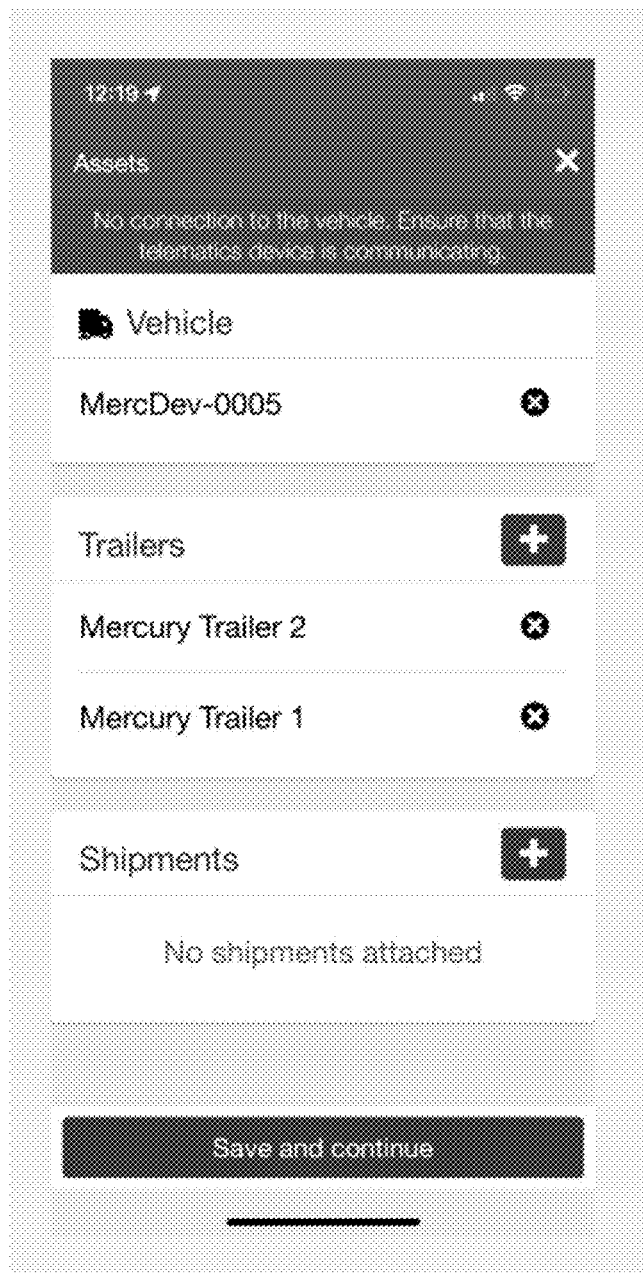
FIG. 8 is an illustration showing a vehicle inspection system menu listing assets to be inspected, in accordance with certain embodiments.
Figure 9:
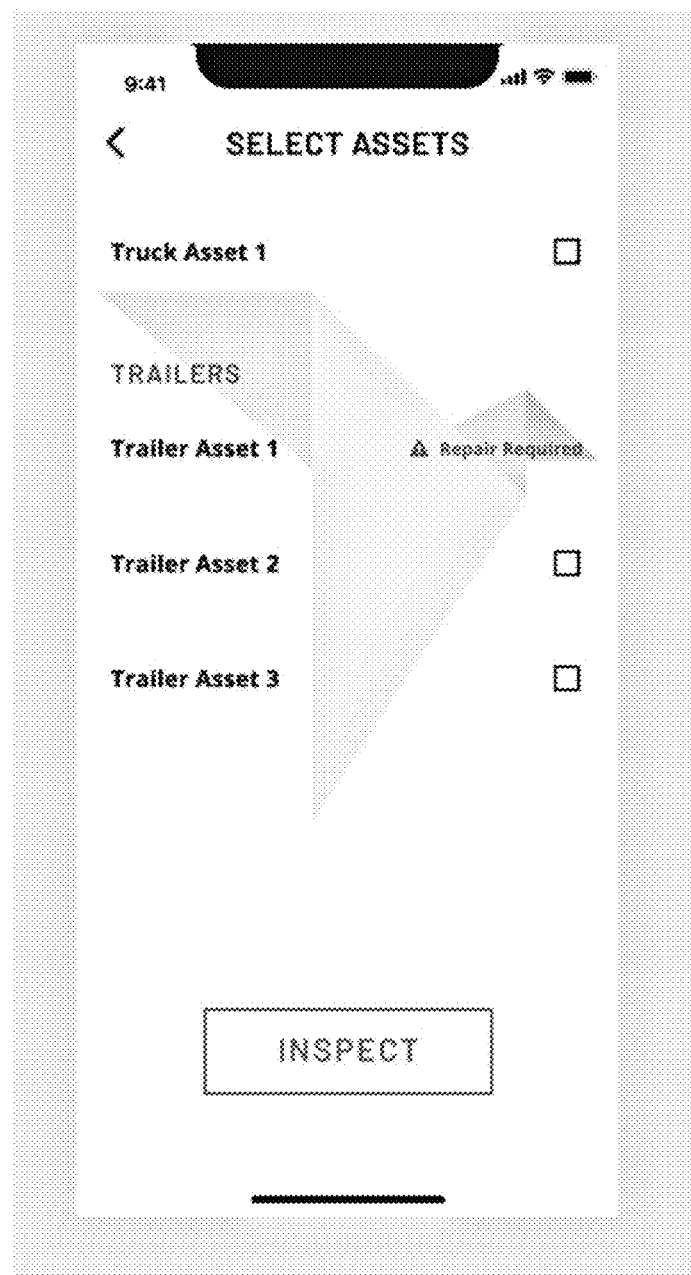
FIG. 9 is an illustration showing a vehicle inspection system menu listing assets to be selected for inspection, in accordance with certain embodiments.
Figure 10:
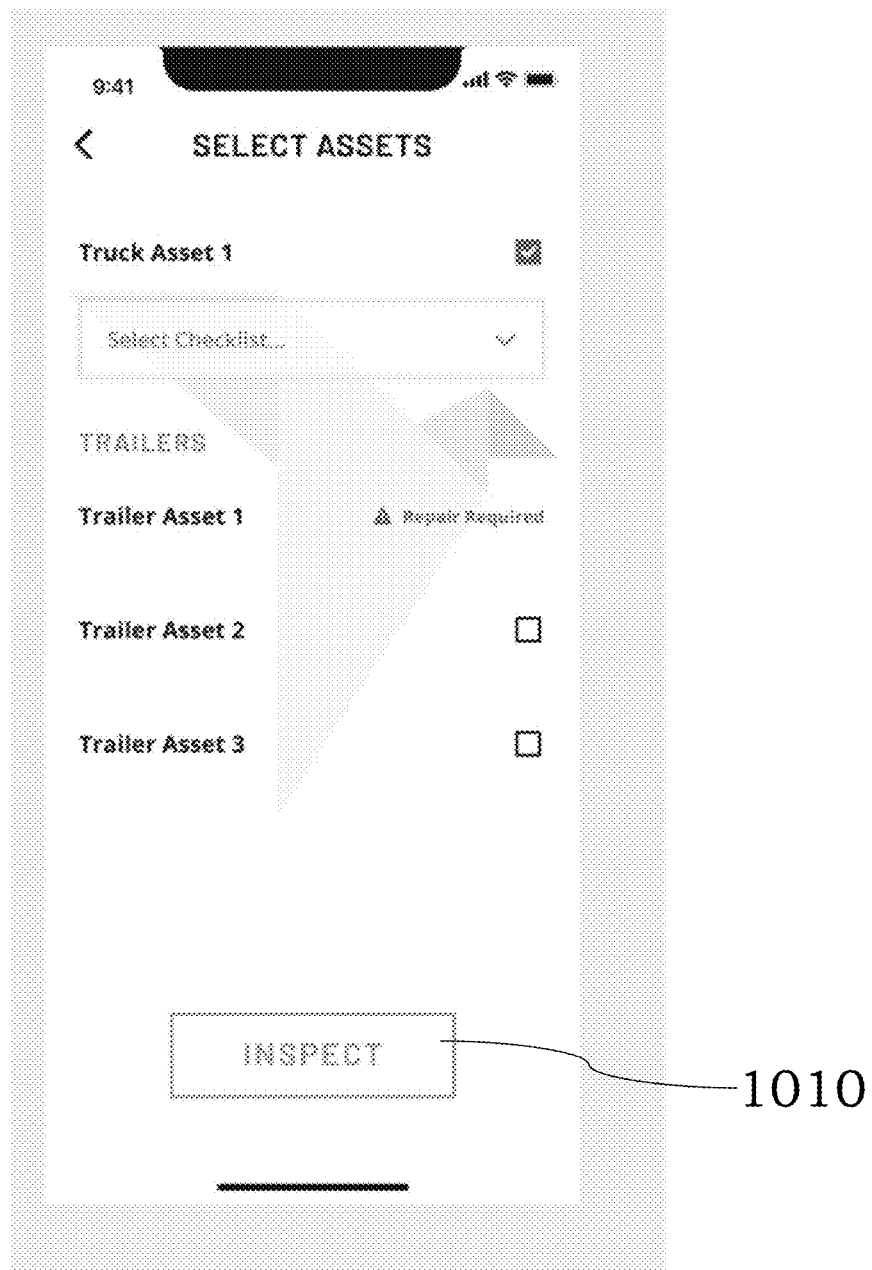
FIG. 10 is another illustration showing a vehicle inspection system menu listing assets to be selected for inspection, in accordance with certain embodiments.
Figure 11:
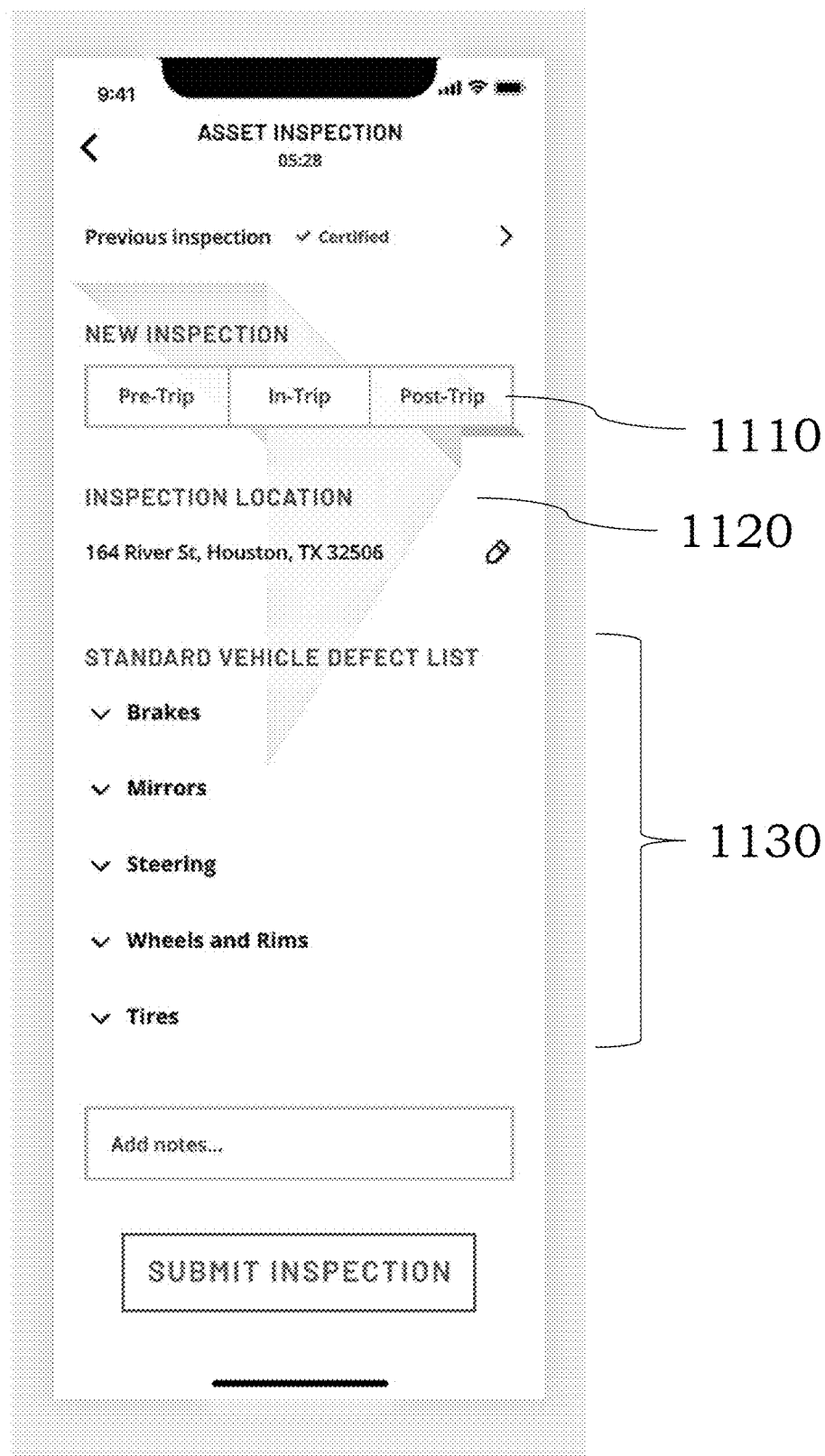
FIG. 11 is an illustration showing a vehicle inspection system menu that lists vehicle components to be inspected, in accordance with certain embodiments.
Figure 12:
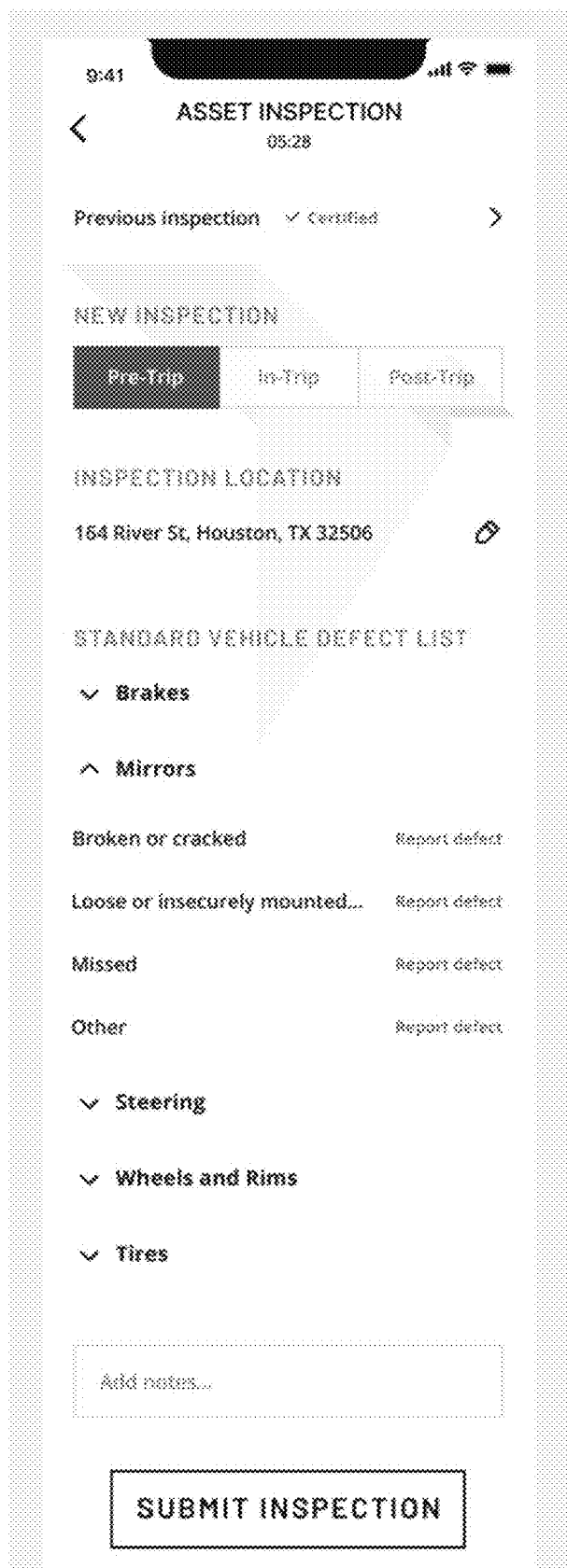
FIG. 12 is another illustration showing a vehicle inspection system menu that lists vehicle components to be inspected, in accordance with certain embodiments.
Figure 13:
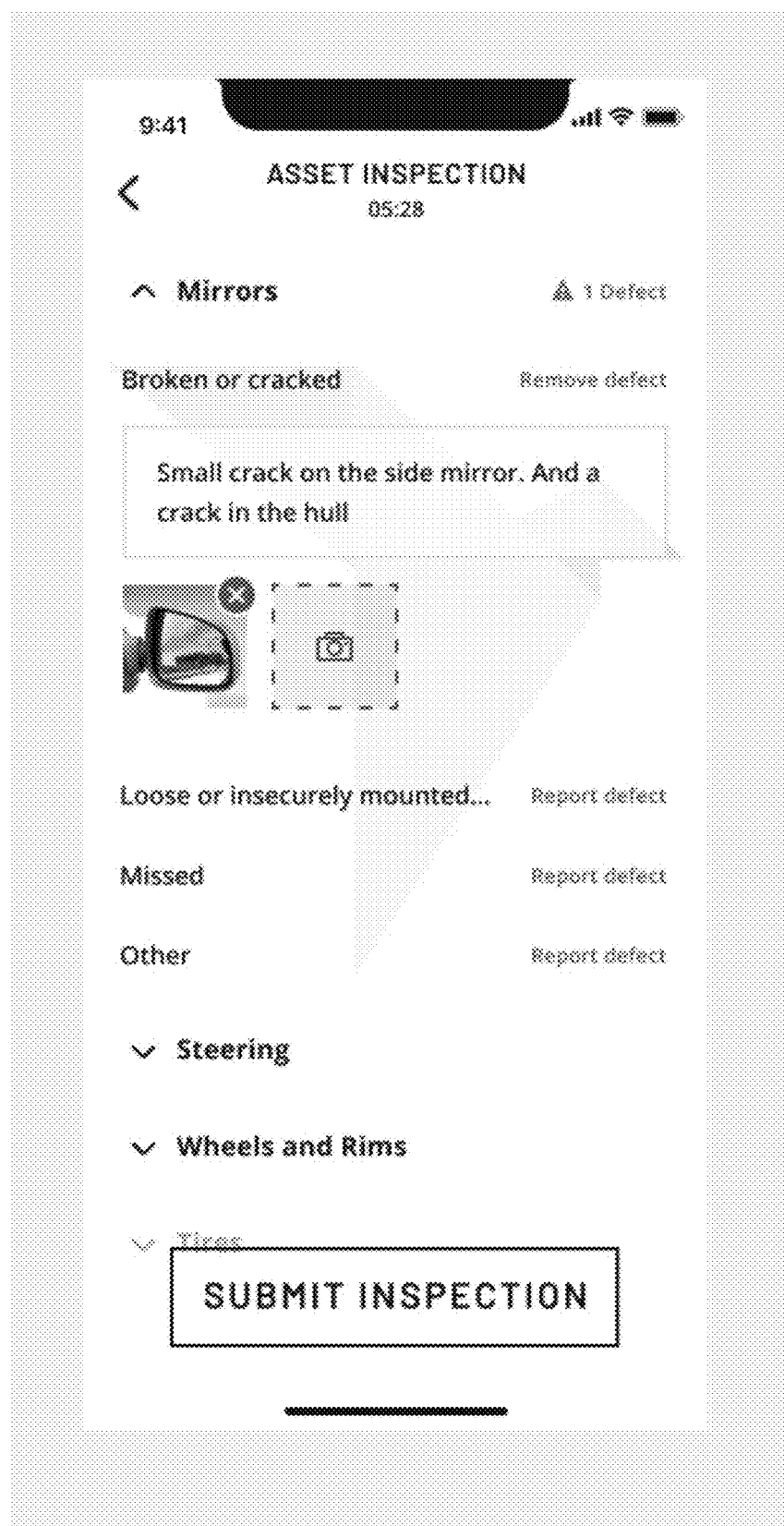
FIG. 13 is an illustration showing a vehicle inspection system menu with an uploaded photograph of a defective component, in accordance with certain embodiments.
Figure 14:
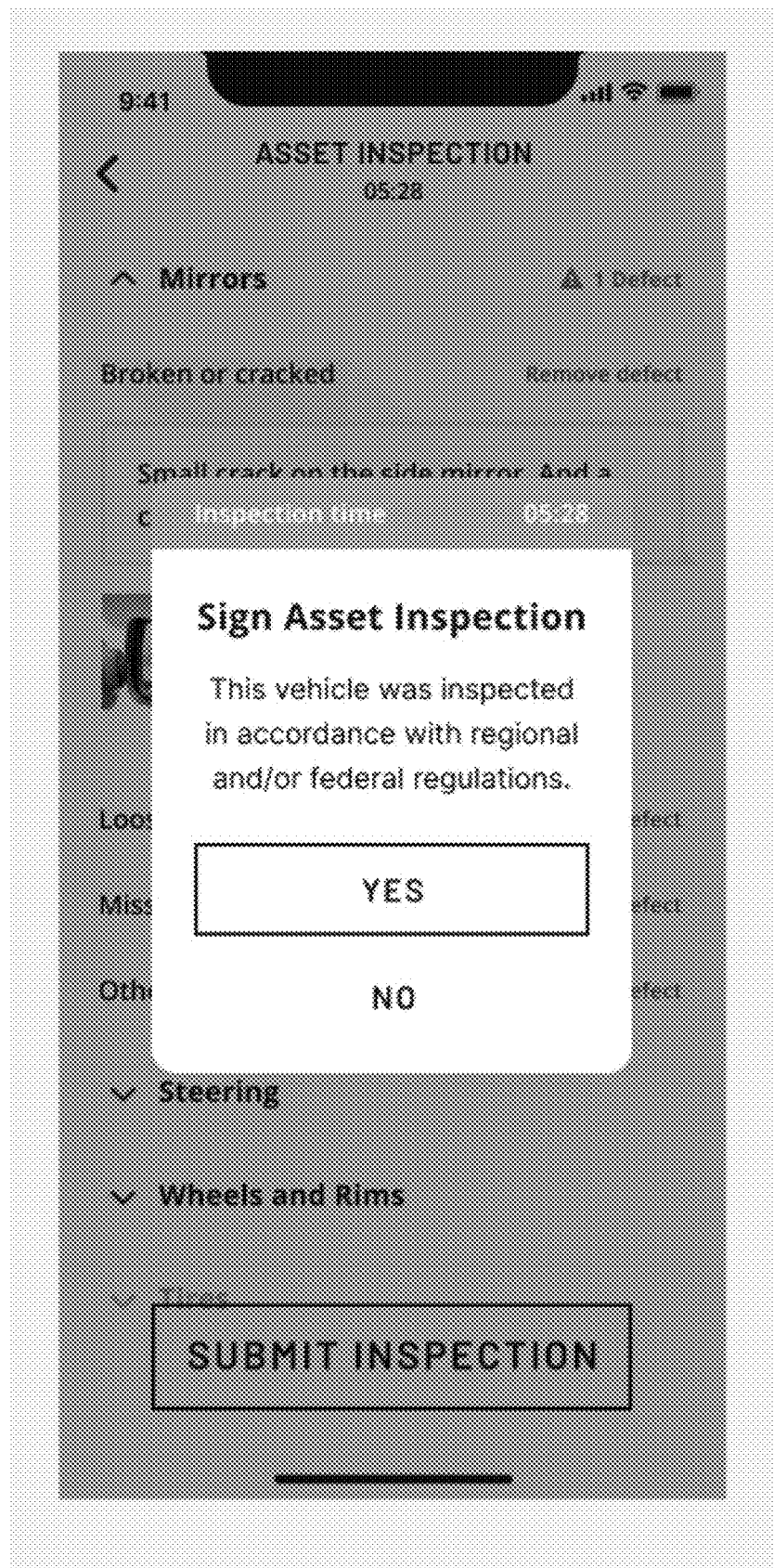
FIG. 14 is an illustration showing a vehicle inspection system menu for submission of the vehicle inspection to a remote administrator, in accordance with certain embodiments.
Figure 15:
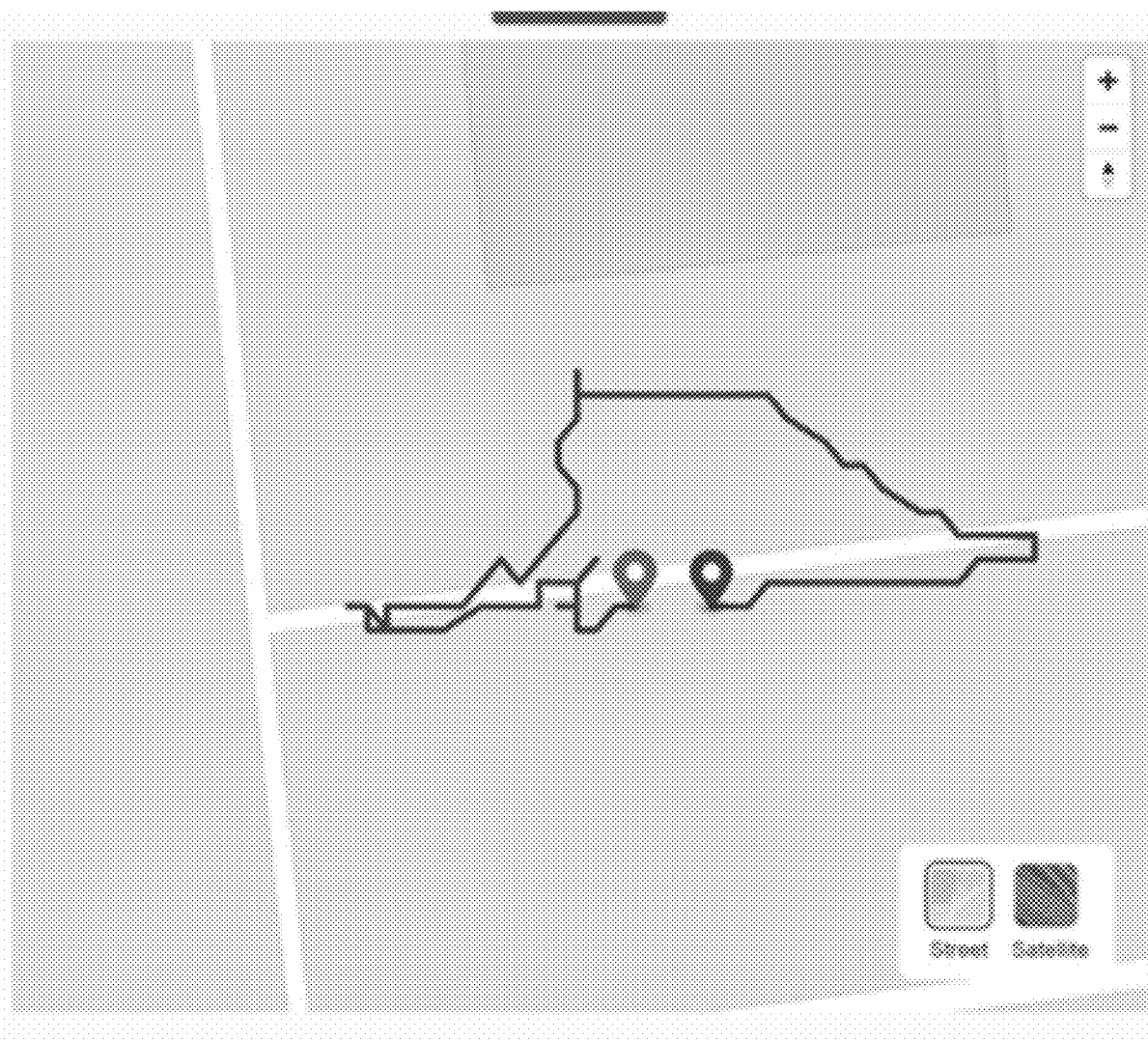
FIG. 15 shows a circumnavigated path of a vehicle inspector produced from GPS tracking during a vehicle inspection, in accordance with certain embodiments.

In certain embodiments, the vehicle inspection system may comprise application software present on a computer readable medium. For example, the vehicle inspection system cam include a non-transitory computer readable medium having instructions stored thereon, wherein the instructions, when executed by a processor of the vehicle inspection system, e.g., a processor of the mobile device, cause the processor to monitor an inspector travel path around a vehicle during inspection of the vehicle by an inspector holding the mobile device and to transmit a circumnavigated path produced from the monitored inspector travel path to a remote administrator through a communication device of the mobile device. The application software can include a suitable user interface as shown in FIGS. 6-14. Referring to FIG. 6, the user interface can include a menu 610 that can be selected by the inspector to initiate the vehicle inspection. An asset, e.g., a vehicle trailer, etc. can be associated with the mobile device and listed under the menu 612. Where multiple assets are listed, the inspector can select the particular asset to be inspected. Where no vehicles or assets are listed, an inspector can select a menu 710 (see FIG. 7) to add a vehicle to be inspected. Once a suitable vehicle is entered into the user interface, the vehicle and any associated trailers, cargo, etc. may then be listed on the user interface as shown in FIG. 8. An inspector can then select a particular asset or assets to be inspected by checking a box next to the vehicle as shown in FIGS. 9 and 10. Once a box is checked, the inspector can then select the inspect box 1010 as shown in FIG. 10. Selection of the inspect tab generates a listing that permits the inspector to select a pre-trip, in-trip or post-trip inspection under menu 1110. An inspection location 1120 can be generated by the system based on GPS coordinates of the mobile device or can be entered by an inspection if desired. A listing 1130 is items to be inspected can be generated. This listing may be altered or controlled by a remote administrator and can be tailored to the specific component(s) to be inspected on specific types of vehicles. The system may force the inspector to inspect each component by selecting a suitable box prior to the inspector being able to submit the inspection. Notes and pictures can be added for each inspected item to permit the remote administrator to schedule service or repair of any noted or defective components. For example, FIGS. 12 and 13 shows the presence of a menu that permit the inspector to note that the side mirror glass and side mirror housing is cracked. A picture of the cracked mirror has been uploaded into the vehicle inspection as shown in FIG. 13 and can be transmitted to the remote administrator for review. Once the inspection is complete, the inspector can submit and sign the inspection as shown in FIG. 14. The inspection information can be transmitted to a remote administrator. A circumnavigated path traversed by the inspector can be generated as shown in FIG. 15 to track the inspector's path around the vehicle. The starting and ending GPS coordinates and discrete or continuous GPS coordinates between the starting and ending GPS coordinates can be used to generate the path. An inspection time can also be sent to permit the remote administrator to determine if a proper inspection likely occurred. If not, the remote administrator could reject the inspection and alert the vehicle inspector to reinspect the vehicle for compliance. Alternatively, a potential non-compliant inspection could be logged without the administrator taking immediate action.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A vehicle inspection system for monitoring inspection of a vehicle by an inspector, the vehicle system comprising:
   a communication device; and
   a processor electrically coupled to the communication device, wherein the processor is configured to monitor an inspector travel path around the vehicle during inspection of the vehicle by the user, to receive inspector inputs during inspection of vehicle components and to transmit a circumnavigated path produced from the monitored inspector travel path and the received inspector inputs to a remote administrator through the communication device.

2. The vehicle inspection system of claim 1, wherein the vehicle inspection system is configured to monitor the inspector travel path during the inspection without the use of any RFID tags or any external electronic devices attached to the vehicle or any vehicle component to be inspected.

3. The vehicle inspection system of claim 1, wherein the communication device comprises a cellular antenna.

4. The vehicle inspection system of claim 3, wherein the communication device comprises a GPS device.

5. The vehicle inspection system of claim 4, further comprising application software on a computer readable medium electrically coupled to the processor.

6. The vehicle inspection system of claim 5, wherein the processor is configured to track an inspection time after initiation of the inspection by the inspector and before transmission of the inspector inputs to the remote administrator.

7. The vehicle inspection system of claim 5, wherein the application software comprises a user interface configured to receive the inspector inputs.

8. The vehicle inspection system of claim 7, wherein the user interface comprises inspector inputs to inspect one or more of service brakes including any trailer brake connections, parking (hand) brake, steering mechanism, lighting devices, reflectors, tires, horn, windshield wipers, rear-vision mirrors, any coupling devices, wheels, rims or emergency equipment.

9. The vehicle inspection system of claim 7, wherein the user interface comprises inspector inputs to inspect each of service brakes including any trailer brake connections, parking (hand) brake, steering mechanism, lighting devices, reflectors, tires, horn, windshield wipers, rear-vision mirrors, any coupling devices, wheels, rims and emergency equipment.

10. A system comprising a mobile device and non-transitory computer readable medium having instructions stored thereon, wherein the instructions, when executed by a processor of the mobile device, cause the processor to monitor an inspector travel path around a vehicle during inspection of the vehicle by an inspector holding the mobile device and to transmit a circumnavigated path produced from the monitored inspector travel path to a remote administrator through a communication device of the mobile device.

11. The system of claim 10, wherein the system is configured to monitor the inspector travel path during the inspection without the use of any RFID tags or any external electronic devices attached to the vehicle or any vehicle component to be inspected.

12. The system of claim 10, wherein the communication device comprises a cellular antenna.

13. The system of claim 12, wherein the communication device comprises a GPS device.

14. The system of claim 13, further comprising application software on the non-transitory computer readable medium.

15. The system of claim 14, wherein the processor is configured to track an inspection time after initiation of the inspection by the inspector and before transmission of the inspector inputs to the remote administrator.

16. The system of claim 14, wherein the application software comprises a user interface configured to receive the inspector inputs.

17. The system of claim 16, wherein the user interface comprises inspector inputs to inspect one or more of service brakes including any trailer brake connections, parking (hand) brake, steering mechanism, lighting devices, reflectors, tires, horn, windshield wipers, rear-vision mirrors, any coupling devices, wheels, rims or emergency equipment.

18. The system of claim 16, wherein the user interface comprises inspector inputs to inspect each of service brakes including any trailer brake connections, parking (hand) brake, steering mechanism, lighting devices, reflectors, tires, horn, windshield wipers, rear-vision mirrors, any coupling devices, wheels, rims and emergency equipment.

19. The system of claim 10, further comprising a telematics device coupled to the processor through the communication device.

20. A non-transitory computer readable medium having instructions stored thereon, wherein the instructions, when executed by a processor, cause the processor to monitor an inspector travel path around a vehicle during inspection of the vehicle by an inspector holding a mobile device and to transmit a circumnavigated path produced from the monitored inspector travel path to a remote administrator through a communication device of the mobile device.

* * * * *